(12) United States Patent
Kim et al.

(10) Patent No.: US 7,417,694 B2
(45) Date of Patent: Aug. 26, 2008

(54) THIN FILM TRANSISTOR ARRAY PANEL AND LIQUID CRYSTAL DISPLAY INCLUDING THE PANEL

(75) Inventors: Dong-Gyu Kim, Yongin-si (KR); Sang-Soo Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 504 days.

(21) Appl. No.: 11/050,675

(22) Filed: Feb. 7, 2005

(65) Prior Publication Data

US 2005/0174503 A1 Aug. 11, 2005

(30) Foreign Application Priority Data

Feb. 6, 2004 (KR) ...................... 10-2004-0007901
Feb. 6, 2004 (KR) ...................... 10-2004-0007902

(51) Int. Cl.
*G02F 1/136* (2006.01)
*G02F 1/1333* (2006.01)
*G02F 1/1337* (2006.01)

(52) U.S. Cl. ............................ 349/44; 349/84; 349/130

(58) Field of Classification Search .................. 349/44, 349/84, 130, 110–111
See application file for complete search history.

(56) References Cited

U.S. PATENT DOCUMENTS

| | | | |
|---|---|---|---|
| 5,715,025 A | 2/1998 | Ogurtsov et al. | |
| 5,926,702 A * | 7/1999 | Kwon et al. | 438/158 |
| 5,933,208 A * | 8/1999 | Kim | 349/106 |
| 6,057,038 A * | 5/2000 | Terashita et al. | 428/447 |
| 7,072,012 B2 * | 7/2006 | Jeong et al. | 349/114 |

| | | |
|---|---|---|
| 2003/0112383 A1 | 6/2003 | Kim |

FOREIGN PATENT DOCUMENTS

| | | |
|---|---|---|
| JP | 10-197894 | 7/1998 |
| JP | 2001-108959 | 4/2001 |
| JP | 2002-131784 | 5/2002 |
| JP | 2003-107502 | 4/2003 |
| JP | 2003-195354 | 7/2003 |
| KR | 10-0139319 | 3/1998 |

(Continued)

OTHER PUBLICATIONS

Patent Abstracts of Japan, Publication No. 10-197894, Jul. 31, 1998, 1 p.

(Continued)

*Primary Examiner*—Mike Qi
(74) *Attorney, Agent, or Firm*—MacPherson Kwok Chen & Heid LLP

(57) ABSTRACT

A thin film transistor (TFT) array panel is provided, which includes: a plurality of gate lines transmitting gate signals; a plurality of data lines intersecting the gate lines and transmitting data signals, each data line including first and second data line branches electrically connected to each other and spaced apart from each other; a plurality of pixel electrodes electrically connected to the gate lines and the data lines through thin film transistor and covering edges of the first or the second data line branches; a passivation layer disposed between the data lines and the pixel electrodes; and a light blocking member covering gaps between the first data line branches and the second data line branches.

23 Claims, 15 Drawing Sheets

FOREIGN PATENT DOCUMENTS

| KR | 1999-026575 | 4/1999 |
|---|---|---|
| KR | 1999-033764 | 5/1999 |
| KR | 1999-048090 | 7/1999 |
| KR | 10-0247272 | 12/1999 |
| KR | 2000-050909 | 8/2000 |
| KR | 2002-074056 | 9/2002 |
| KR | 10-0385886 | 5/2003 |

OTHER PUBLICATIONS

Patent Abstracts of Japan, Publication No. 2001-108959, Apr. 20, 2001, 1 p.
Patent Abstracts of Japan, Publication No. 2002-131784, May 9, 2002, 1 p.
Patent Abstracts of Japan, Publication No. 2003-1075002, Apr. 9, 2003, 1 p.
Patent Abstracts of Japan, Publication No. 2003-195354, Jul. 9, 2003, 1 p.
Korean Patent Abstracts, Publication No. 100139319, Mar. 2, 1998, 1 p.
Abstract of Korean Patent, Publication No. 1999-026575, Apr. 15, 1999, 1 p.
Korean Patent Abstracts, Publication No. 1019990033764, May 15, 1999, 1 p.
Korean Patent Abstracts, Publication No. 1019990048090, Jul. 5, 1999, 1 p.
Korean Patent Abstracts, Publication No. 100247272, Dec. 10, 1999, 1 p.
Korean Patent Abstracts, Publication No. 1020000050909, Aug. 5, 2000, 1 p.
Korean Patent Abstracts, Publication No. 1020020074056, Sep. 28, 2002, 1 p.
Korean Patent Abstracts, Publication No. 100385886, May 19, 2003, 1 p.

* cited by examiner

\# THIN FILM TRANSISTOR ARRAY PANEL AND LIQUID CRYSTAL DISPLAY INCLUDING THE PANEL

BACKGROUND OF THE INVENTION (a) Field of the Invention

The present invention relates to a thin film transistor array panel and a liquid crystal display including the panel having high aperture ratio.

(b) Description of Related Art

A liquid crystal display (LCD) generally includes an upper panel provided with a common electrode, a lower panel having thin film transistors (TFTs) and pixel electrodes, and a liquid crystal (LC) layer interposed between the panels. The pixel electrodes and the common electrode are supplied with different voltages to generate an electric field that changes the orientations of the LC molecules, thereby adjusting light transmittance to display images.

One of the important issues of the LCD is an aperture ratio. A high aperture ratio increases the luminance of the LCD and also has several other advantages. For this purpose, a pixel electrode and data lines adjacent thereto overlap each other. However, the overlap of the pixel electrode supplied with a pixel voltage and the data lines transmitting continuously varying data voltages make parasitic capacitance that may cause several defects. For example, lithography for manufacturing the LCD performs an exposure step after dividing a panel into several blocks when a lithography mask is smaller than an active area provided with the pixel electrodes. The distance between the pixel electrodes and the data lines in different blocks may be somewhat different depending on the alignment degree between the mask and the panel. This differentiates the parasitic capacitance between the pixel electrodes and the data lines block by block to cause a stitch defect.

SUMMARY OF THE INVENTION

The present invention makes the parasitic capacitance generated between the pixel electrodes and the data lines uniform.

A thin film transistor (TFT) array panel is provided, which includes: a plurality of gate lines transmitting gate signals; a plurality of data lines intersecting the gate lines and transmitting data signals, each data line including first and second data line branches electrically connected to each other and spaced apart from each other; a plurality of pixel electrodes electrically connected to the gate lines and the data lines through thin film transistor and covering edges of the first or the second data line branches; a passivation layer disposed between the data lines and the pixel electrodes; and a light blocking member covering gaps between the first data line branches and the second data line branches.

A thin film transistor (TFT) array panel is provided, which includes: a plurality of gate lines transmitting scanning signals; a plurality of data lines intersecting the gate lines and transmitting data signals, each data line including first and second data line branches electrically connected to each other and spaced apart from each other; a plurality of pixel electrodes electrically connected to the gate lines and the data lines through thin film transistor and covering edges of the first or the second data line branches; a color filter layer disposed between the data lines and the pixel electrodes; and a light blocking member including the same layer as the gate lines and overlapping the data lines.

In this way, each data line includes a pair of data line branches parallel to each other, the pixel electrodes overlap the data line branches, and a light blocking member covers gaps between the data line branches. Therefore, the parasitic capacitance between the data lines and the pixel electrodes is reduced and the aperture ratio is increased.

The present invention includes several embodiments according to the positions of the data lines including pairs of the data line branches, the pixel electrodes overlapping the data lines, and the light blocking members covering gaps between the data line branches.

A TFT array panel according to embodiments of the present invention includes gate lines transmitting gate signals; data lines intersecting the gate lines and transmitting data signals, each data line including first and second data line branches spaced apart from each other near pixel electrodes at least in part, pixel electrodes disposed in pixel electrodes defined by the gate lines and the data lines, and thin film transistors including gate electrodes connected to the gate lines, source electrodes connected to the data lines, and drain electrodes connected to the pixel electrodes.

The TFT array panel further includes an insulating layer disposed on the thin film transistors, the gate lines, and the data lines. The pixel electrodes may be disposed on the insulating layer, and the insulating layer may be made of organic insulating material or may include color filters. The TFT array panel may further include storage electrodes overlapping the pixel electrodes to form storage capacitance.

Each data line has a shape repeatedly appearing by a unit of length of a pixel. A pair of data line branches are parallel to each other. The data lines may be rectilinear or curved. When the data lines are curved, each data line may include curved portions and rectilinear portions arranged repeatedly. The rectilinear portions may intersect the gate lines. Each of the curved portions may include a plurality of oblique portions making angles of about 45 degrees clockwise and counterclockwise. The pixel electrodes may be curved along the data lines. Here, the pixel electrodes may cover both edges for the data lines adjacent thereto. The light blocking member may be electrically disconnected from the data lines and may be made of organic material or metal. The light blocking member covers the gaps between the data line branches and has outer edges lying within outer edges of the data line branches.

An LCD including the TFT array panel further includes the common electrode panel facing the TFT array panel and including the common electrode facing the pixel electrodes and a liquid crystal layer disposed between the TFT array panel and the common electrode panel.

The liquid crystal layer may have several variations. Although the embodiments illustrate TN mode LCDs, the invention can also be employed for a vertical alignment mode. A vertical alignment mode LCD includes a liquid crystal layer having negative dielectric anisotropy and long axes of the liquid crystal molecules are aligned vertical to surfaces of the panels. The vertical alignment mode LCD has cutouts or protrusions provided at the common electrode and the pixel electrodes, which differentiate the tilt directions of the liquid crystal molecules upon the application of electric field to the LC layer, thereby improving so called viewing angle.

The TFT array panel may further include semiconductors disposed between gate electrodes and source/drain electrodes. The semiconductors may have shapes of islands. However, the semiconductors may extend along the data lines such that they have substantially the same planar shape as the data lines and the drain electrodes except for channel portions between the source electrodes and the drain electrodes.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
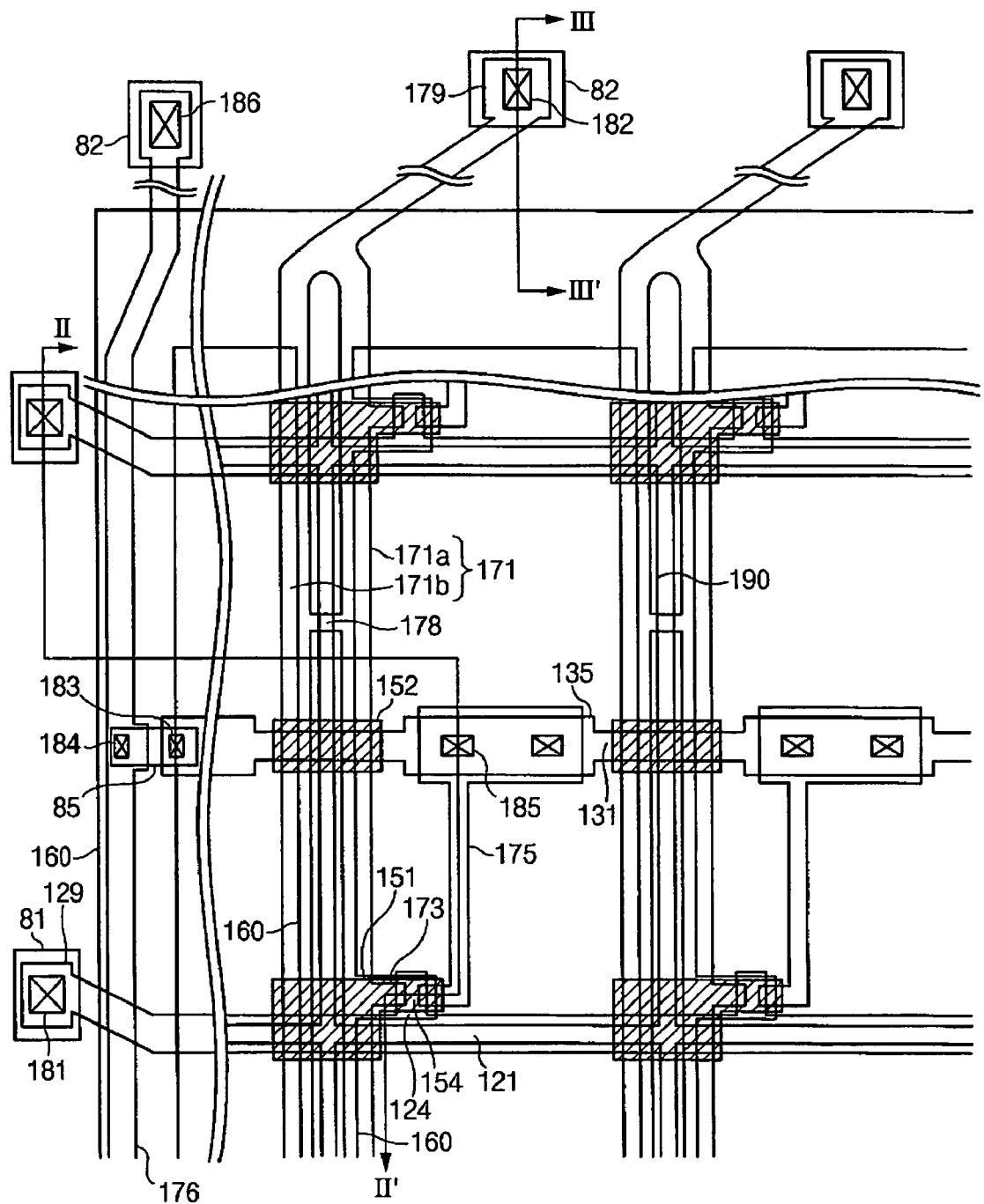
FIG. 1 is a layout view of a TFT array panel for an LCD according to a first embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, LCDs according to embodiments of the present invention will be described with reference to the accompanying drawings.

Figure 2:
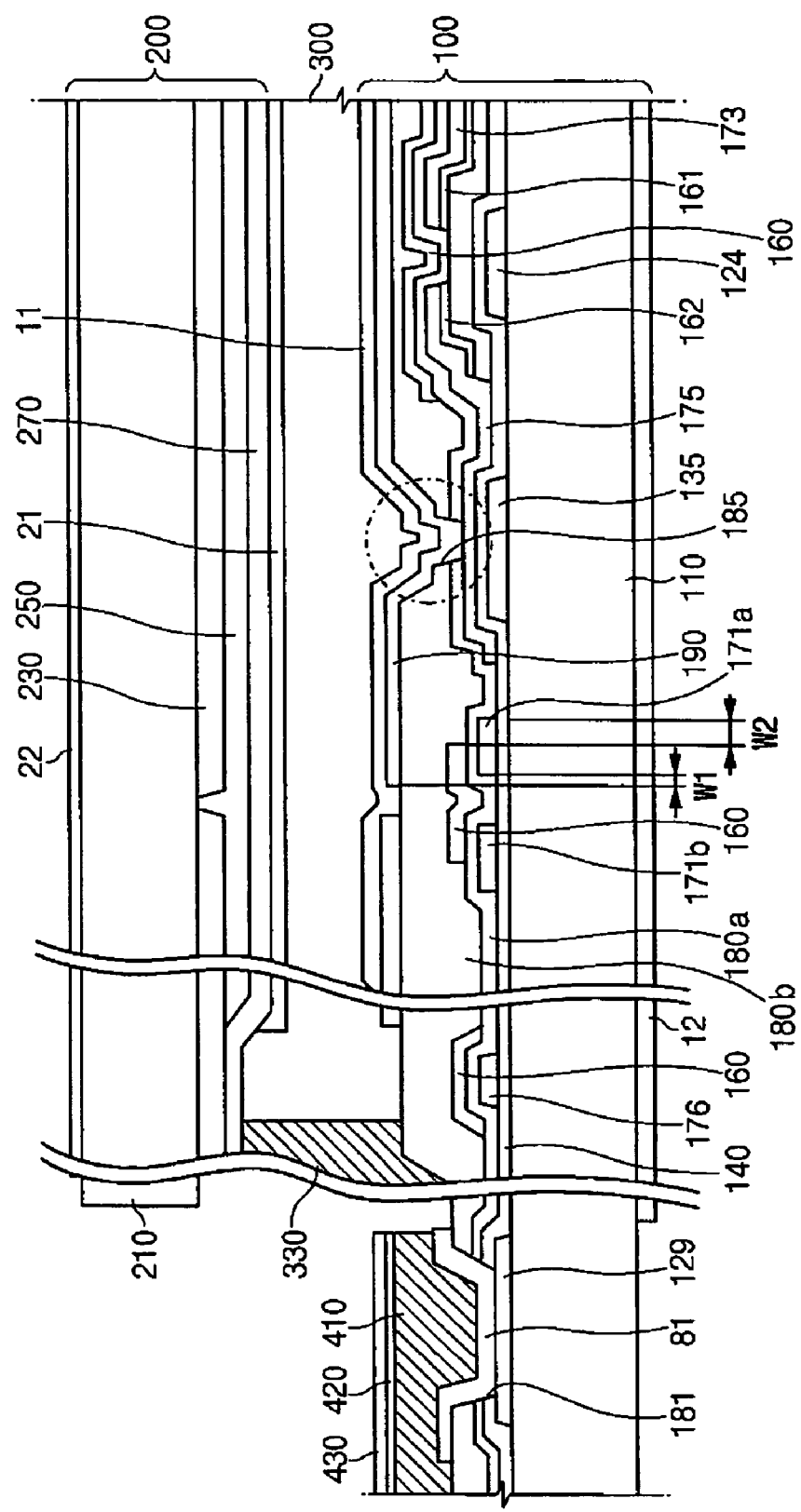
FIG. 2 is a sectional view of an LCD including the TFT array panel shown in FIG. 1 and a common electrode panel taken along the line II-II'.
Figure 3:
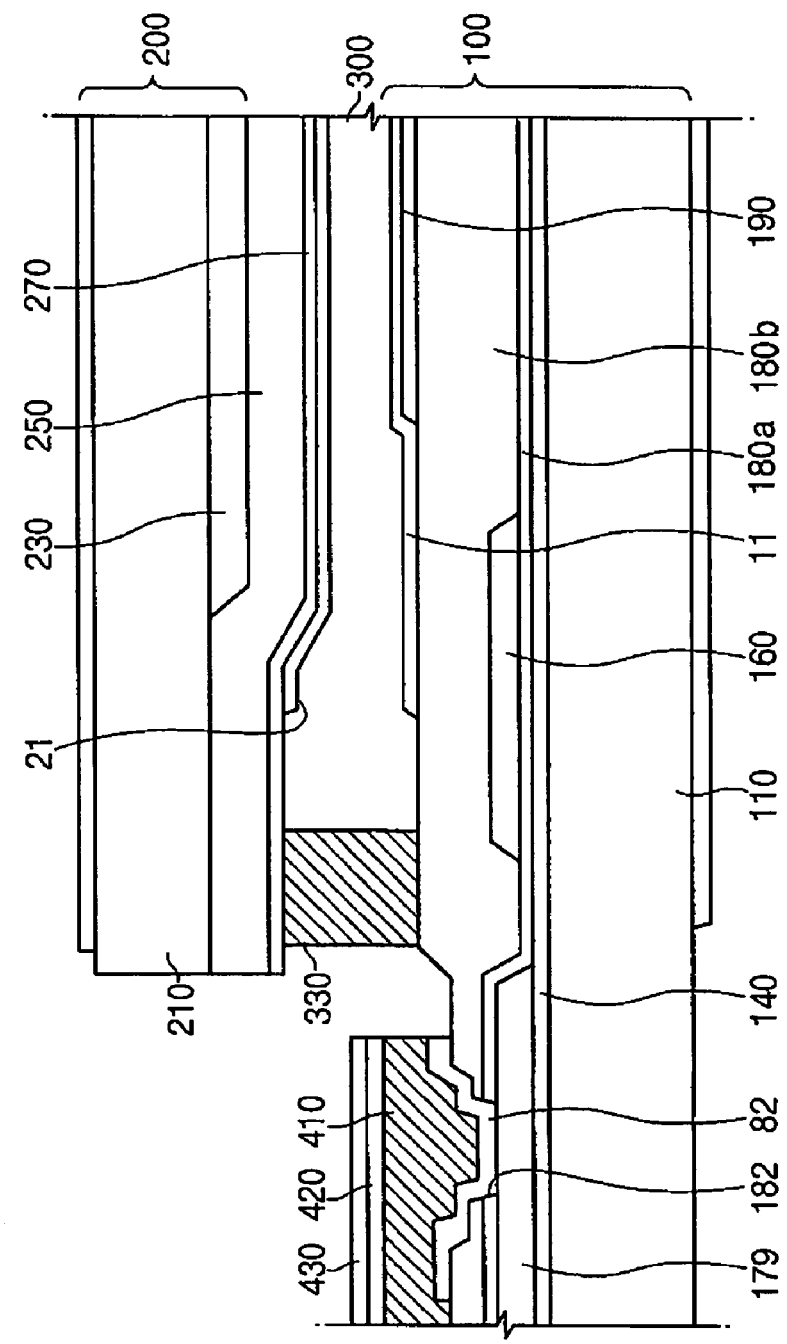
FIG. 3 is a sectional view of an LCD including the TFT array panel shown in FIG. 1 and a common electrode panel taken along the line III-III'.

FIG. 1 is a layout view of a TFT array panel for an LCD according to a first embodiment of the present invention, FIG. 2 is a sectional view of an LCD including the TFT array panel shown in FIG. 1 and a common electrode panel taken along the line II-II', and FIG. 3 is a sectional view of an LCD including the TFT array panel shown in FIG. 1 and a common electrode panel taken along the line III-III'.

Referring to FIGS. 2 and 3, an LCD according to this embodiment includes a TFT array panel 100 and the common electrode panel 200 facing each other and an LC layer 300 and a sealant 330. On the TFT array panel 100, a film 430 such as a flexible printed circuit film having signal lines 420 and an anisotropic conductive film 410 attaching the film 430 to the panel 100 are formed.

First, the TFT array panel 100 is schematically described.

Referring to FIG. 1, a plurality of pixel electrodes 190 preferably made of transparent conductive material such as indium tin oxide (ITO) or indium zinc oxide (IZO), a plurality of TFTs connected to the pixel electrodes 190, a plurality of gate lines 121 connected to the TFTs and transmitting scanning signals, and a plurality of data lines 171, each data line 171 connected to the TFTs and including a pair of data line branches 171a and 171b for transmitting data signals are formed on an insulating substrate 110 preferably made of a transparent insulator such as glass. The TFTs turn on/off to selectively transmit data signals to the pixel electrodes 190 in response to the scanning signals. Here, an area provided with the pixel electrodes 190 is referred to as an active area (or a display area) and an area disposed out of the active area is referred to as a peripheral area.

The TFT array panel 100 is described in detail.

A plurality of gate lines 121 and a plurality of storage electrode lines 131, which extend substantially in a transverse direction, are formed on an insulating substrate 110 such as transparent glass.

The gate lines 121 are separated from each other and transmit gate signals. Each gate line 121 includes a plurality of projections forming a plurality of gate electrodes 124 and an end portion 129 for receiving the gate signal from an external circuit. The gate lines 121 may extend to be connected output terminals of a driving circuit that may be integrated on the TFT array panel 100.

Each storage electrode line 131 includes a plurality of wide storage electrodes 135.

A voltage transmission line (not shown) for transmitting a common voltage to the common electrode panel 200 may be formed of the same layer as the gate lines 121.

The gate lines 121 and the storage electrode lines 131 are preferably made of Al, Al alloy, Ag, Ag alloy, Cu, Cr, Ti, Ta, or Mo. The gate lines 121 and the storage electrode lines 131 according to this embodiment include a single layer, but they may have a dual-layered structure including a refractory metal layer such as Cr, Mo, Ti, Ta, etc., having excellent physicochemical characteristics and a low resistivity layer including Al or Ag containing metal. When employing a metal containing Al, the gate lines 121 and the storage electrode lines 131 include at least two layers for preventing the contact between Al and the material for the pixel electrodes 190. Several metals or conductors can be employed for the gate lines 121 and the storage electrode lines 131.

In addition, the lateral sides of the gate lines 121 and the storage electrode lines 131, etc., are inclined relative to a horizontal surface, and the inclination angle thereof ranges about 30-80 degrees.

A gate insulating layer 140 preferably made of silicon nitride (SiNx) is formed on the gate lines 121 and the storage electrode lines 131.

A plurality of data lines 171, a plurality of drain electrodes 175, and a storage connection 176 are formed on the gate insulating layer 140.

Each drain electrode 175 extends to and overlaps a storage electrode of a storage electrode line 131. A storage capacitance is obtained by overlapping the drain electrode 175 and the storage electrode 131 with a dielectric interposed therebetween, including the gate insulating layer 140.

Each data line 171 extends substantially in a longitudinal direction and includes a plurality of source electrodes 173 branched toward the drain electrodes 175. Each data line 171 further includes a contact portion 179 for receiving data signals from an external device. Here, each data line 171 includes a pair of data line branches 171a and 171b electrically connected to each other in the active area. Each pair of data line branches 171a and 171b are connected to each other through a plurality of data connections 178 in the active area and combined to form the contact portion 179.

The storage connection 176 is disposed out of the active area and extends substantially in the longitudinal direction to intersect the gate lines 121 near the end portions 129 of the gate lines 121. The storage connection 176 is located adjacent to end portions of the storage electrode lines 131, and connected to all the storage electrode lines 131 to supply a predetermined voltage such as the common voltage, which is supplied to the common electrode panel 200, to the storage electrode lines 131, which will be described later. Without the end portions 129 of the gate lines 121, the storage electrode lines 131 may be incorporatedly connected.

The data lines 171, the drain electrodes 175, and the storage connection 176 are preferably made of Cr, Mo, Al, etc. Although they include a single layer as shown in FIGS. 2 and 3, they may have a multi-layered structure. An example of the multi-layered structure includes triple layers a Mo layer, an Al layer, and another Mo layer. Like this, the multi-layered structure includes an intermediate metal layer having low resistivity such as Al, and upper and lower refractory metal layers such as Mo.

A plurality of semiconductor islands 154 are formed under the source electrodes 173, the drain electrodes 175, and portions disposed therebetween. FIG. 1 shows the semiconductor islands 154 are wider than the source electrodes 173 and the drain electrodes 175, but it may be reversed. A plurality of other semiconductor islands 152 are formed at the intersections of the storage electrode lines 131 and the data lines 171, and furthermore. The semiconductors 154 are also disposed between the gate lines 121 and the data lines 171 at the intersections thereof for preventing the disconnection of the signal lines 121 and 171. Unlike FIG. 1, the semiconductors 154 may extend along the data lines 171. The semiconductors 152 and 154 are preferably made of amorphous silicon, etc.

A plurality of ohmic contact islands 161 and 162 are formed between the semiconductor islands 151 and 152 and the source electrodes 173 and the drain electrodes 175 or between the semiconductor islands 151 and 152 and the data lines 171 for reducing contact resistance therebetween. The ohmic contacts 161 and 162 are preferably made of silicide or amorphous silicon heavily doped with n type impurity.

A gate electrode 124, a source electrode 173, and a drain electrode 175 along with a projection 154 of a semiconductor stripe 151 form a TFT.

A thin inorganic passivation layer 180a is formed on the data lines 171, the drain electrodes 175, the storage connection 176, and the exposed portions of the semiconductor stripes 151, which are not covered with the data lines 171, the drain electrodes 175, and the storage connection 176. The inorganic passivation layer 180 is preferably made of inorganic material such as silicon nitride formed by plasma enhanced chemical vapor deposition (PECVD) and has a thickness of about 300 Å-700 Å. The inorganic passivation layer 180a has a plurality of contact holes 185, 181, 182, 183, 184 and 186 disposed on portions of the drain electrodes 175, the end portions 129 of the gate lines 121, the contact portions 179 of the data lines 171, the end portions of the storage electrode lines 131, and intermediate portions and an end portion of the storage connection 176.

A light blocking member 160 is formed on the inorganic passivation layer 180a as shown in FIG. 1 and 2. The light blocking member 160 covers space between the data line branches 171a and 171b. The light blocking member 160 is disposed within outer edges of the data line branches 171a and 171b in the active area for preventing the decrease of the aperture ratio. It is preferable that the distance w2 between the outer edges of the data line branches 171a and 171b and the outer edges of the light blocking member 160 is larger than about one microns as shown in FIG. 2. The light blocking member 160 is preferably made of an inorganic insulator for preventing the generation of parasitic capacitance with the data lines 171. A photo resistive material may facilitate the formation of the light blocking member 160. A photoresist containing carbon or black die dispersed therein is a preferable example.

The light blocking member 160 has a shape of a band surrounding the active area at the peripheral area as shown in FIG. 1, which prevents the light leakage between the active area and the peripheral area. This enables the omission of a separate light blocking member on the common electrode panel 200.

An organic insulating layer 180b is formed on the light blocking member 160 and exposed portions of the inorganic passivation layer 180a. An organic insulating layer 180b is preferably made of low dielectric insulating material having a dielectric constant lower than about 3.0 and having a good flatness characteristic. The organic passivation layer 180b has a thickness of about 0.7 microns. The organic passivation layer 180b also has a plurality of contact holes 185, 181, 182, 183, 184 and 186 disposed on portions of the drain electrodes 175, the end portions 129 of the gate lines 121, the contact portions 179 of the data lines 171, the end portions of the storage electrode lines 131, and intermediate portions and an end portion of the storage connection 176, like the contact holes 185, 181, 182, 183, 184 and 186 of the inorganic passivation layer 180a.

The usage of the contact holes 185, 181, 182, 183, 184 and 186 are roughly two. The contact holes disposed near the edges the TFT array panel 100 are provided for receiving several signals from a semiconductor chip, and those disposed at inner portions of the panel 100 are provided for electrically connecting inner signal lines. The electrical connection is performed by forming conductive connections on the passivation layer 180b and connecting the connections to underlying conductors, which will be described later.

In particular, the contact holes 181 and 186 disposed on the end portions 129 of the gate lines 121 and the end portions of the storage electrode lines 131 penetrate not only the passivation layers 180a and 180b and the gate insulating layer 140 to expose the signal lines 121 and 131 disposed under the gate insulating layer 140.

As indicated by reference numeral C in FIG. 2, for example, the organic passivation layer 180b becomes thinner near the contact holes 185 exposing the drain electrodes 175 to smooth the profile from the surface of the organic passivation layer 180b to the bottom of the contact holes 185. In order to easily form such a structure, the organic passivation layer 180*b* is preferably made of photosensitive material as described above. In this case, a method of forming a contact hole 185 structure having a smooth profile is described.

First, a positive photosensitive organic layer is formed on the substrate 110 and a photo mask (not shown) is aligned with the substrate 110. The substrate 110 is then exposed to light through the photo mask.

The photo mask includes transparent areas, opaque areas, and translucent areas having a slit pattern. The slit pattern has a plurality of slits that have width smaller than the resolution of an exposer (not shown) used in this step. The transparent areas of the photo mask correspond to the contact holes 185 and the slits are disposed around the transparent areas. The amount of light exposure through the slit pattern is small and the light amount at the contact holes 185 exposed through the transparent areas is sufficient such that portions of the photoresist film having small light exposure are remained to a thickness, while portions corresponding to the contact holes 185 subjected to sufficient light amount may be completely removed. Next, exposed portions of the inorganic passivation layer 180*a* and the gate insulating layer 140 are dry etched by using the organic passivation layer 180*b* as a etch stopper to form the contact holes 185.

In order to form the contact holes 186 and 181 that expose wires including the same layer as the gate lines 121 such as the storage electrode lines 131, portions of the inorganic gate insulating layer 140 are also dry etched to be removed. At this time, the metal layer that is exposed through the contact holes on the wires including the same layer as the data line 171 is hardly etched since the etch selectivity for metal and inorganic insulator is very different.

On the other hand, since the parasitic capacitance near the contact portions 179 of the data lines 171 and the end portions 129 of the gate lines 121 is insignificant, the thickness of the organic passivation layer 180*b* becomes timmer there than at the active area as shown in FIGS. 2 and 3. This improves contact reliability when pad bumps (not shown) of driving circuit chips or the film 430 including the signal lines for transmitting the gate signals and the data signals are attached to the exposed portions of the wires 121 and 171 through the contact holes 181 and 182 with the anisotropic conductive film 410. For this purpose, in the step for forming the passivation layers 180*a* and 180*b*, the translucent areas having slits smaller than the resolution of the exposer or including translucent material face the peripheral area to lower the height of the passivation layer 180*b* compared with the active area including the pixel electrodes 190, like the contact holes.

A plurality of pixel electrodes 190, a plurality of contact assistants 81, 82 and 86, and a plurality of connectors 85 such as those connecting the storage electrode lines 131 and the storage connection 176 are formed on the passivation layer 180*b*. The pixel electrodes 190, the contact assistants 81, 82 and 86, and the connections 85 are preferably made of ITO or IZO. The contact assistants 81, 82 and 86 are electrically connected to the end portions 129 of the gate lines 121, the contact portions 179 of the data lines 171, and the end portions of the storage connection 176 through the contact holes 181, 182 and 186 disposed therein, respectively.

The pixel electrodes 190, as shown in FIG. 1 and 2, fully cover inner edges of the data line branches 171*a* and 171*b* adjacent thereto. Referring to FIG. 2, it is preferable that the distance w1 between the edges of the pixel electrodes 190 and the inner edges of the data line branches 171*a* and 171*b* adjacent thereto is larger than about 2 microns. However, the distance may be varied depending on the alignment margin of an exposing device. The pixel electrodes 190 are electrically connected to the TFTs through the contact holes 185 on the drain electrodes 175 extending to the storage electrode lines 131.

As described above, since the pixel electrodes 190 covers the inner edges of the data line branches 171*a* and 171*b* adjacent thereto, the parasitic capacitance between the pixel electrodes 190 and the data line branches 171*a* and 171*b* is uniform regardless of the transverse deviation of the distance therebetween in the alignment margin of the panel 100.

Now, the common electrode panel 200 is described in detail.

A color filter layer 230 is formed on a transparent insulating substrate 210 such as glass. The color filter layer 230 faces the pixel electrodes 190 of the TFT array panel 100. A transparent organic insulating layer 250 is formed on the color filter layer 230 and a common electrode 270 is formed thereon. The transparent insulating layer 250 is optional, and, in this case, the common electrode 270 is disposed directly on the color filter layer 230. As described above, since the light blocking member 160 of the TFT array panel 100 sufficiently blocks the light leakage, the common electrode panel 200 does not include a light blacking member such as a black matrix.

Alignment layers 11 and 21 are formed on inner surfaces of the TFT array panel 100 and the common electrode panel 200, and polarizers 12 and 22 are attached to outer surfaces of the TFT array panel 100. The alignment layers 11 and 21 are disposed almost within the active area.

The sealant 330 is disposed between the TFT array panel 100 and the common electrode panel 200 and has a shape of a band that extends around the common electrode panel 200. It is preferable that the sealant 330 and the light blocking member 160 overlap each other at least in part in order to prevent the light leakage.

The LC layer 300 is disposed between the alignment layers 11 and 21 on the pixel electrodes 190 and the common electrode 270 of the TFT array panel 100 and the common electrode panel 200 and sealed in an area enclosed by the sealant 330.

Various LCDs are configured depending on the material of the alignment layers 11 and 21, the type of the liquid crystal layer 300, the alignment type, and so on. The LCD shown in FIG. 1-3 is preferably used in a twisted Nematic (TN) mode.

When the LCD is in a vertical alignment mode, the pixel electrodes 190 and the common electrode 270 preferably have a plurality of cutouts (not shown) for increasing viewing angle. The cutouts are parallel to each other and curved at least once. The electric field generated by the pixel electrodes 190 and the common electrode 270 are distorted by the fringe field effect of the cutouts such that the tilt directions of the LC molecules on the pixel electrodes 190 are various. Instead of providing the cutouts at both the electrodes 190 and 270, only the pixel electrodes 190 that have the cutouts and protrusions may be provided on the common electrode 270. The protrusions are disposed between the alignment layer 21 and the common electrode 270 and they are parallel to the cutouts of the pixel electrode 190. The protrusions may be made of photosensitive organic material. The difference between the permittivity of the protrusions and the liquid crystal or inclined surfaces of the protrusions determine the tilt directions of the LC molecules. As a result, the fringe field effect on one side and the permittivity effect or the inclined surface effect on the other side diversifies the tilt directions of the LC molecules. Without cutouts, the protrusions may be provided on both the pixel electrodes 190 and the common electrode 270.

Figure 4:
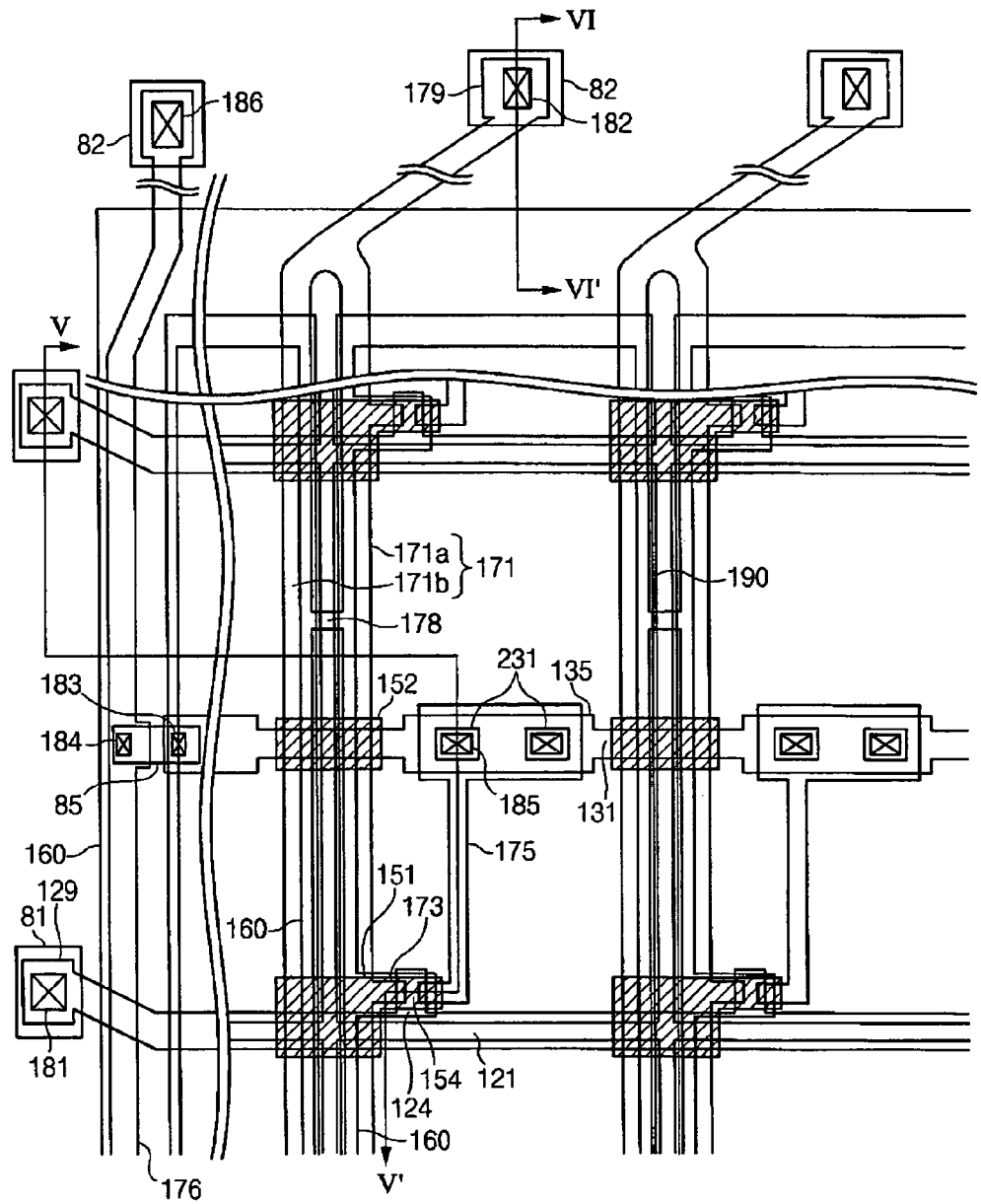
FIG. 4 is a layout view of a TFT array panel for an LCD according to a second embodiment of the present invention.
Figure 5:
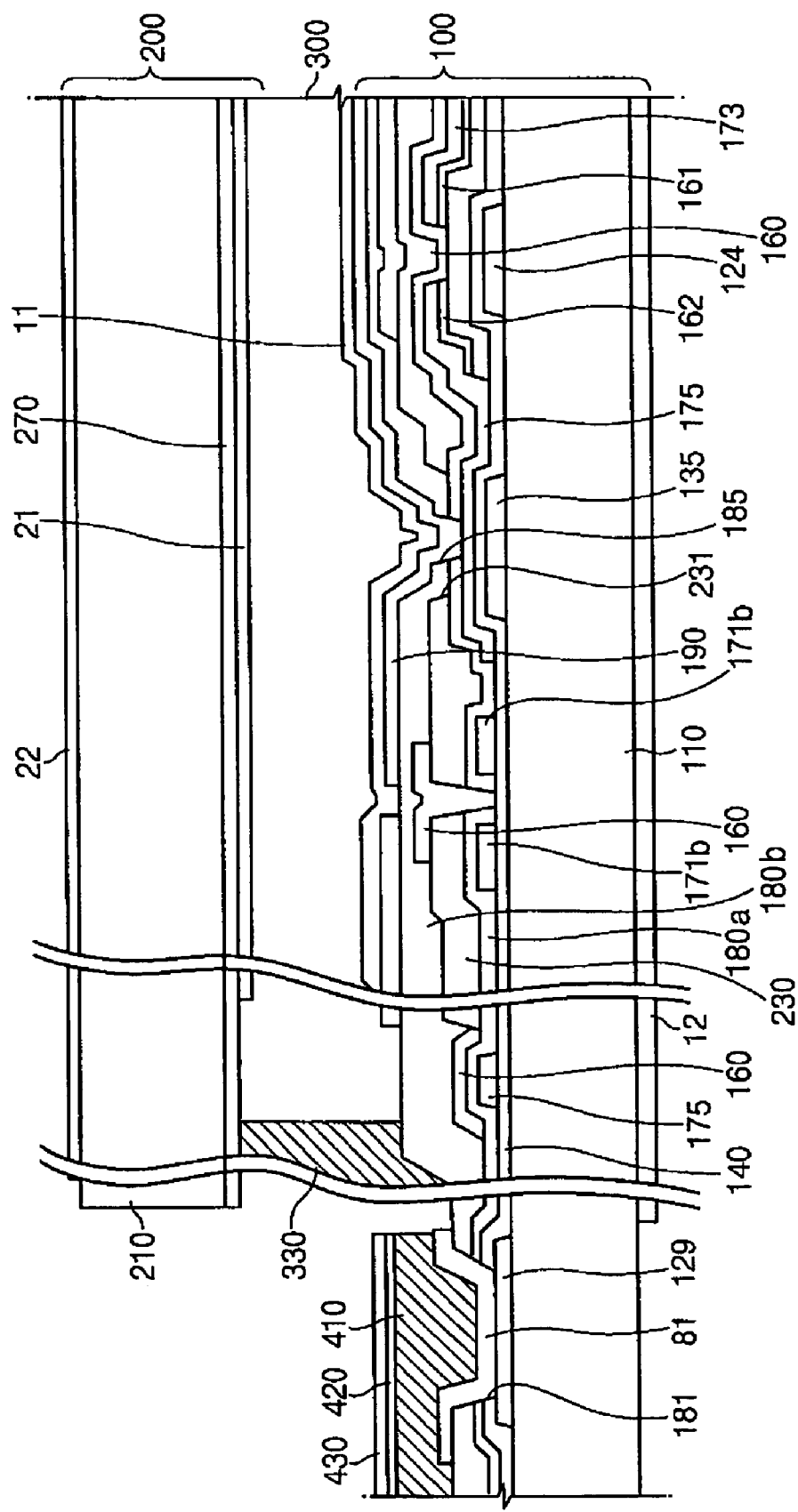
FIG. 5 is a sectional view of an LCD including the TFT array panel shown in FIG. 4 and a common electrode panel taken along the line V-V'.
Figure 6:
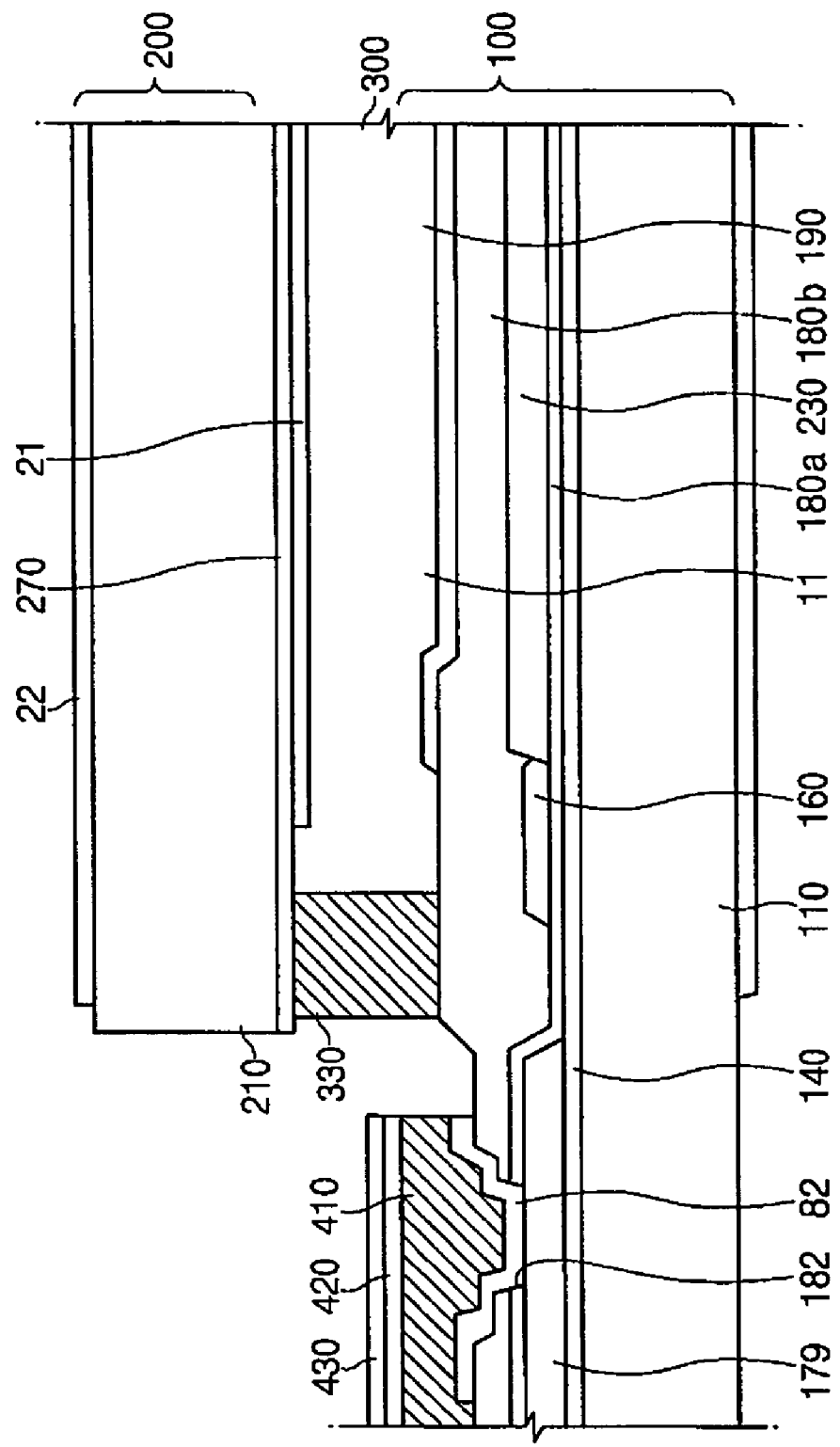
FIG. 6 is a sectional view of an LCD including the TFT array panel shown in FIG. 4 and a common electrode panel taken along the line VI-VI'.

Referring to FIG. 4-6, an LCD according to a second embodiment of the present invention will be described in detail.

FIG. 4 is a layout view of a TFT array panel for an LCD according to a second embodiment of the present invention, FIG. 5 is a sectional view of an LCD including the TFT array panel shown in FIG. 4 and a common electrode panel taken along the line V-V', and FIG. 6 is a sectional view of an LCD including the TFT array panel shown in FIG. 4 and a common electrode panel taken along the line VI-VI'.

The LCD according to the second embodiment has a layout and a structure similar to the LCD according to the first embodiment.

Regarding the TFT array panel 100, a plurality of gate lines 121 including gate electrodes 124 and a plurality of storage electrode lines 131 are formed on a substrate 110, and a gate insulating layer 140, a plurality of semiconductor islands 154, and a plurality of ohmic contact islands 161 and 162 are sequentially formed thereon. A plurality of data lines 171 including source electrodes 173 and including pairs of the data line branches 171a and 171b, a plurality of drain electrodes 175, and a storage connection 176 are formed on the ohmic contacts 161 and 162, and an inorganic passivation layer 180a is formed thereon. A light blocking member 160 is formed on the inorganic passivation layer 180a and an organic passivation layer 180b is formed thereon. A plurality of contact holes 181-186 are provided at the passivation layers 180a and 180b and the gate insulating layer 140. A plurality of pixel electrodes 190, a plurality of contact assistants 81 and 82, and a plurality of connections 85 are formed on the organic passivation layer 180b.

The common electrode panel 200 includes an insulating substrate 210 and a common electrode 270 formed thereon.

Alignment layers 11 and 21 are formed on inner surfaces of the two panels 100 and 200, and polarizers 12 and 22 are provided on outer surfaces of the panels 100 and 200. A sealant 330 and an LC layer 300 are formed between the panels 100 and 200, and a film 430 having signal lines 420 is attached onto the TFT array with anisotropic conductive film 410.

Referring to FIGS. 4 and 5, the color filter layer 230 of the LCD according to this embodiment is disposed on the TFT array panel 100 but not on the common electrode panel 200. The color filter layer 230 is disposed between the inorganic passivation layer 180a and the light blocking member 160. The color filter layer 230 represents three primary colors such as red, green, and blue. The color filter layer 230 has edges disposed between the data line branches 171a and 171b and covering inner edges of the data line branches 171a and 171b. The color filter layer 230 is disposed only in the active area and has a plurality of contact holes 231 exposing edges of the contact holes 185 of the inorganic passivation layer 180a. Since the color filter layer 230 is disposed on the TFT array panel 100, the common electrode 270 is disposed directly on the glass substrate 210 as shown in FIG. 5. Accordingly, the common electrode panel 200 according to this embodiment is easily formed without lithography.

Figure 7:
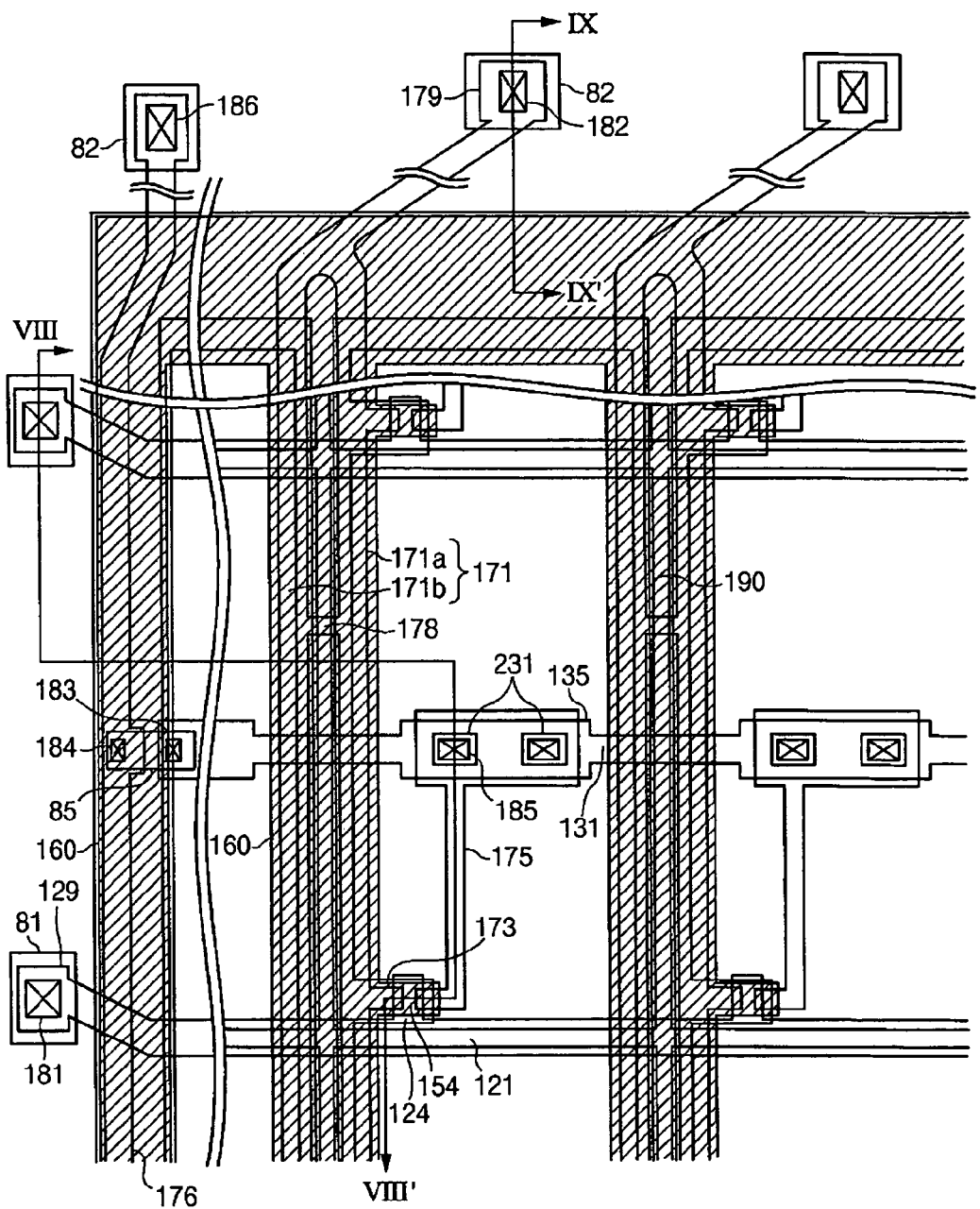
FIG. 7 is a layout view of a TFT array panel for an LCD according to a second embodiment of the present invention.
Figure 8:
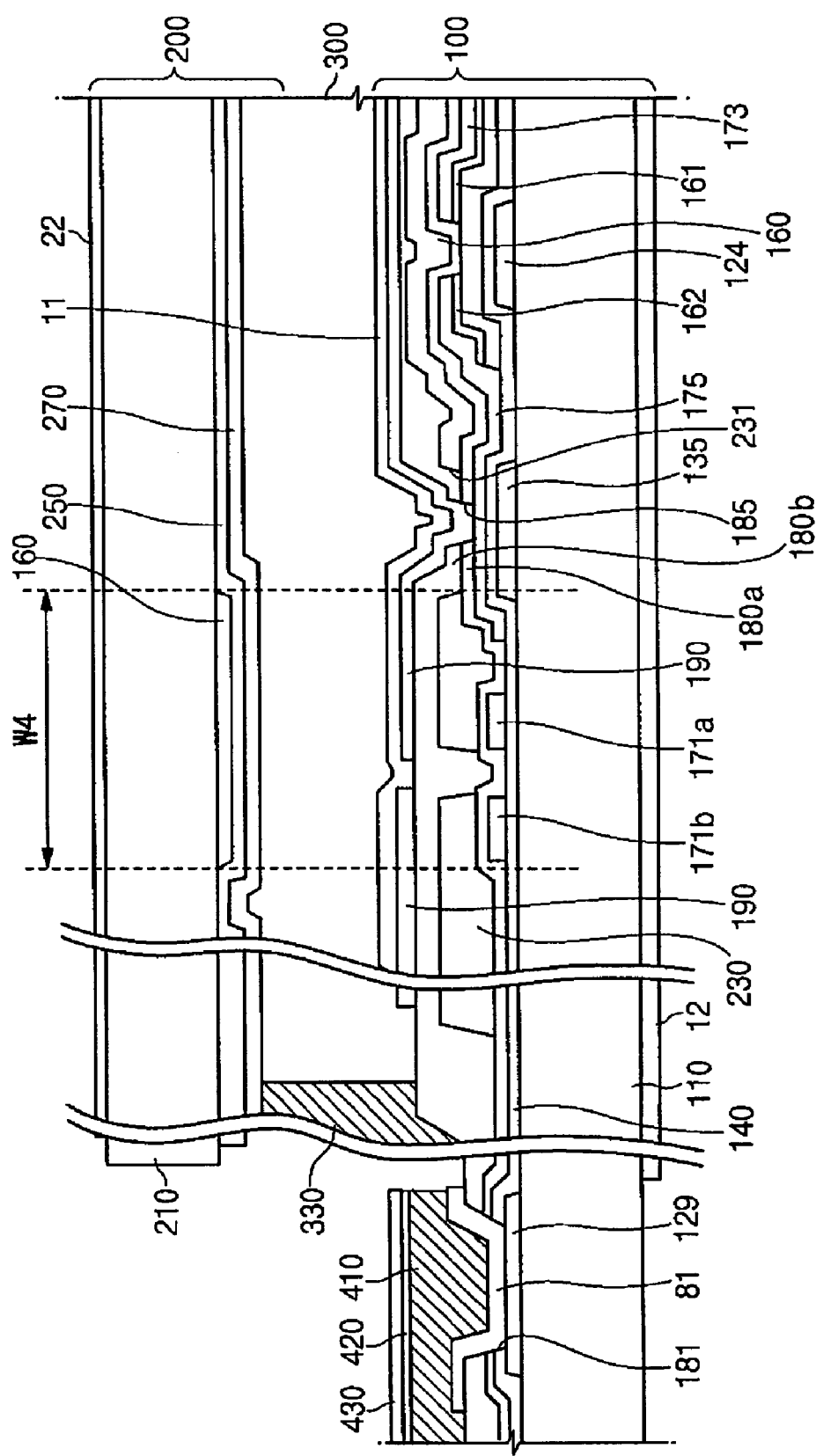
FIG. 8 is a sectional view of an LCD including the TFT array panel shown in FIG. 7 and a common electrode panel taken along the line VII-VII'.
Figure 9:
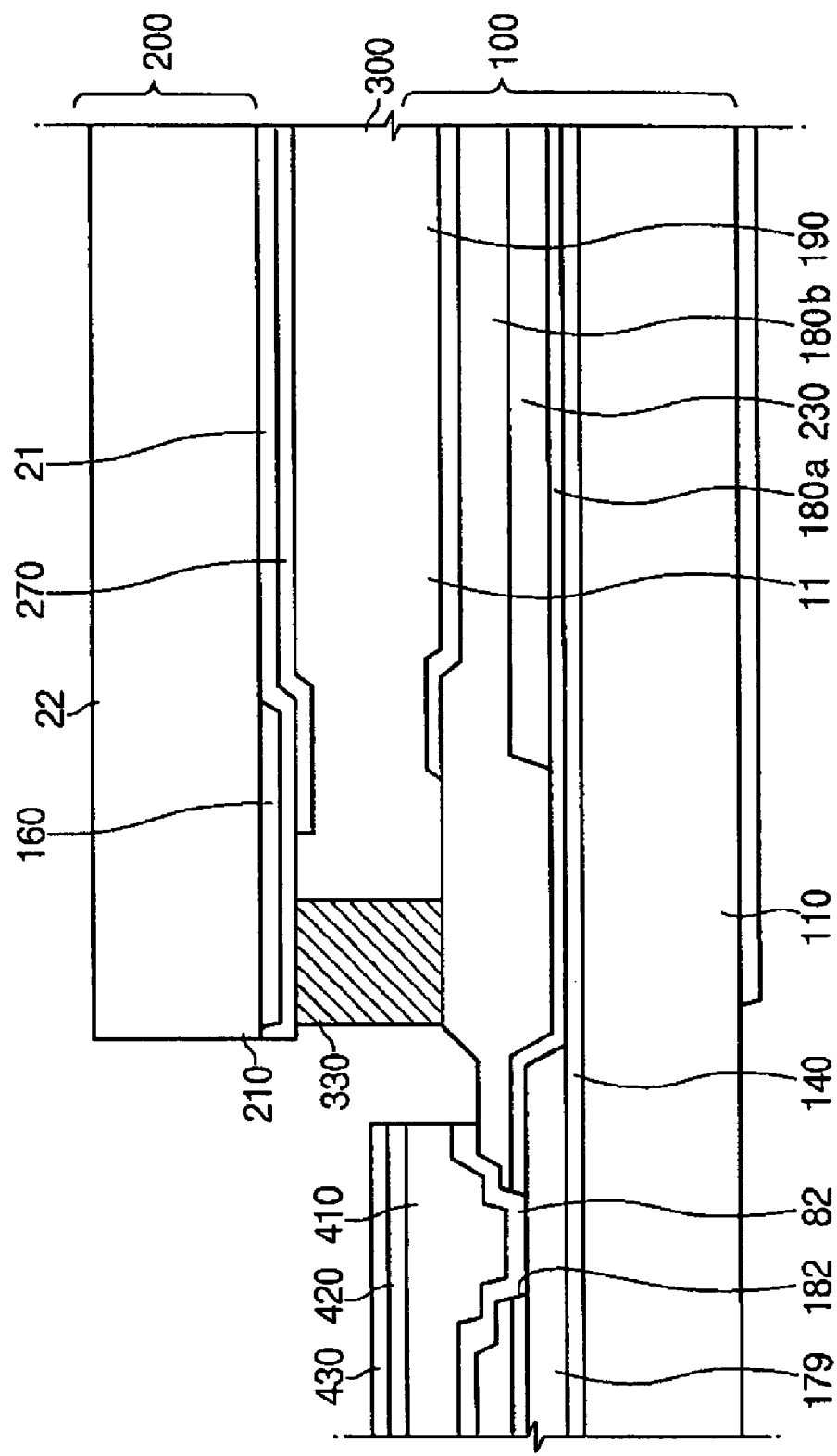
FIG. 9 is a sectional view of an LCD including the TFT array panel shown in FIG. 7 and a common electrode panel taken along the line IX-IX'.

Referring to FIG. 7-9, an LCD according to a third embodiment of the present invention will be described in detail.

FIG. 7 is a layout view of a TFT array panel for an LCD according to a second embodiment of the present invention, FIG. 8 is a sectional view of an LCD including the TFT array panel shown in FIG. 7 and a common electrode panel taken along the line VII-VII', and FIG. 9 is a sectional view of an LCD including the TFT array panel shown in FIG. 7 and a common electrode panel taken along the line IX-IX'.

The LCD shown in FIG. 7-9 has a layout and a structure similar to the LCD shown in FIG. 4-6.

Regarding the TFT array panel 100, a plurality of gate lines 121 including gate electrodes 124 and a plurality of storage electrode lines 131 are formed on a substrate 110, and a gate insulating layer 140, a plurality of semiconductor islands 154, and a plurality of ohmic contact islands 161 and 162 are sequentially formed thereon. A plurality of data lines 171 including source electrodes 173 and including pairs of the data line branches 171a and 171b, a plurality of drain electrodes 175, and a storage connection 176 are formed on the ohmic contacts 161 and 162, and an inorganic passivation layer 180a is formed thereon. A color filter layer 230 is formed on the inorganic passivation layer 180a and an organic passivation layer 180b is formed thereon. A plurality of contact holes 181-186 are provided at the passivation layers 180a and 180b and the gate insulating layer 140 and a plurality of contact holes 231 are formed in the color filter layer 230. A plurality of pixel electrodes 190, a plurality of contact assistants 81 and 82, and a plurality of connections 85 are formed on the organic passivation layer 180b.

The common electrode panel 200 includes an insulating substrate 210 and a common electrode 270 formed thereon.

Alignment layers 11 and 21 are formed on inner surfaces of the two panels 100 and 200, and polarizers 12 and 22 are provided on outer surfaces of the panels 100 and 200. A sealant 330 and an LC layer 300 are formed between the panels 100 and 200, and a film 430 having signal lines 420 is attached onto the TFT array with anisotropic conductive film 410.

Referring to FIGS. 7 and 9, a light blocking member 160 of the LCD according to this embodiment is disposed between the insulating substrate 210 and the common electrode 270 on the common electrode panel 200. The light blocking member 160 on the TFT array panel 100 shown in FIG. 7 is merely a projection thereof drawn for comprehension. After the assembly of the panels 100 and 200, it is preferable that the light blocking member 160 is wider than the data lines 171 and in particular, it covers pairs of data line branches 171a and 171b.

In the first and the second embodiments, the light blocking member 160 is disposed between the inorganic passivation layer 180a and the organic passivation layer 180b, or on the color filter layer 230, the location of the light blocking member 160 is not significant when it is made of inorganic material. For example, the light blocking member 160 may be disposed under the inorganic passivation layer 180a or the color filter layer 230. In this case, it is preferable that the light blocking member 160 is narrower than the data lines 171a and 171b as described above.

The second and the third embodiments can omit the organic passivation layer 171b with maintaining the color filter layer 230 depending on the material of the color filter layer 230. In this case, it is preferable that adjacent color filters overlap each other for planarization.

In the first to the third embodiments, semiconductors may be disposed between all conductors including the same layer as the data lines 171 and the gate insulating layer 140. This can be obtained by sequentially depositing a semiconductor layer, an ohmic contact layer, and a data metal layer and patterning the layers in sequence when manufacturing the panel 100.

Each pixel electrode 190 may have a shape of a boomerang that is curved at least once instead of a rectangular shape. In this case, the data lines 171 and the light blocking member 160 may be curved like the pixel electrodes 190.

Figure 10:
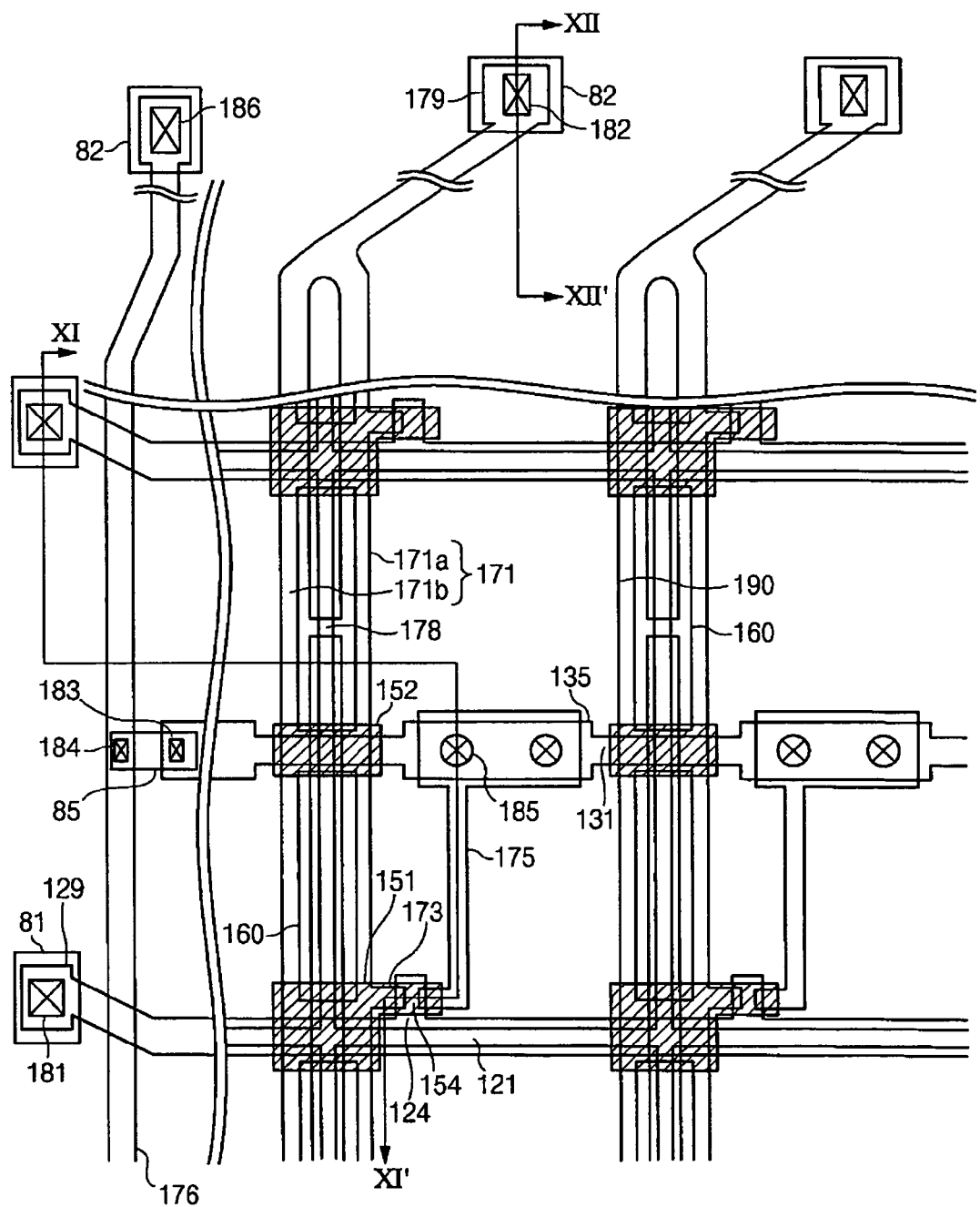
FIG. 10 is a layout view of a TFT array panel for an LCD according to a fourth embodiment of the present invention.
Figure 11:
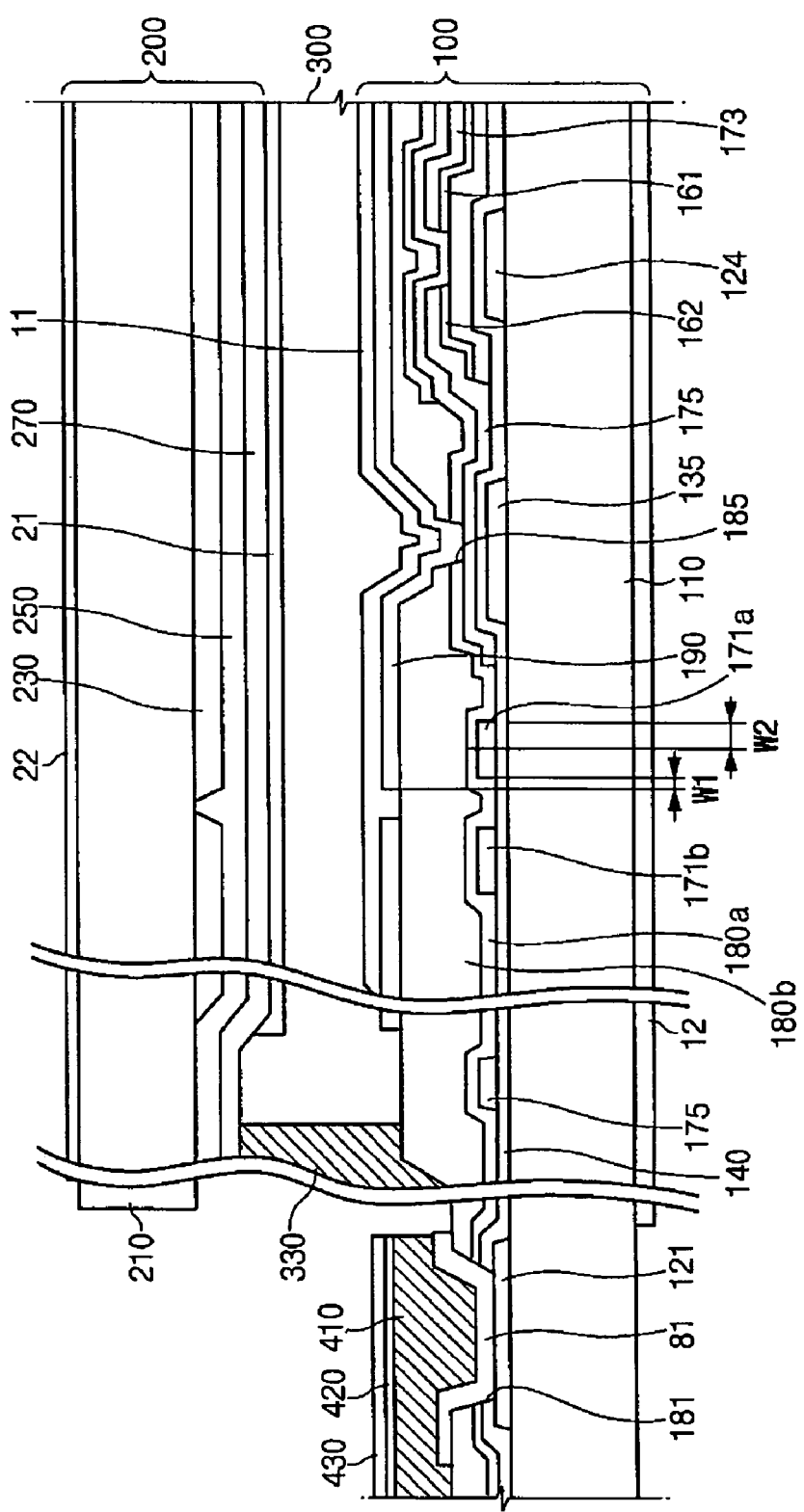
FIG. 11 is a sectional view of an LCD including the TFT array panel shown in FIG. 10 and a common electrode panel taken along the line XI-XI'.
Figure 12:
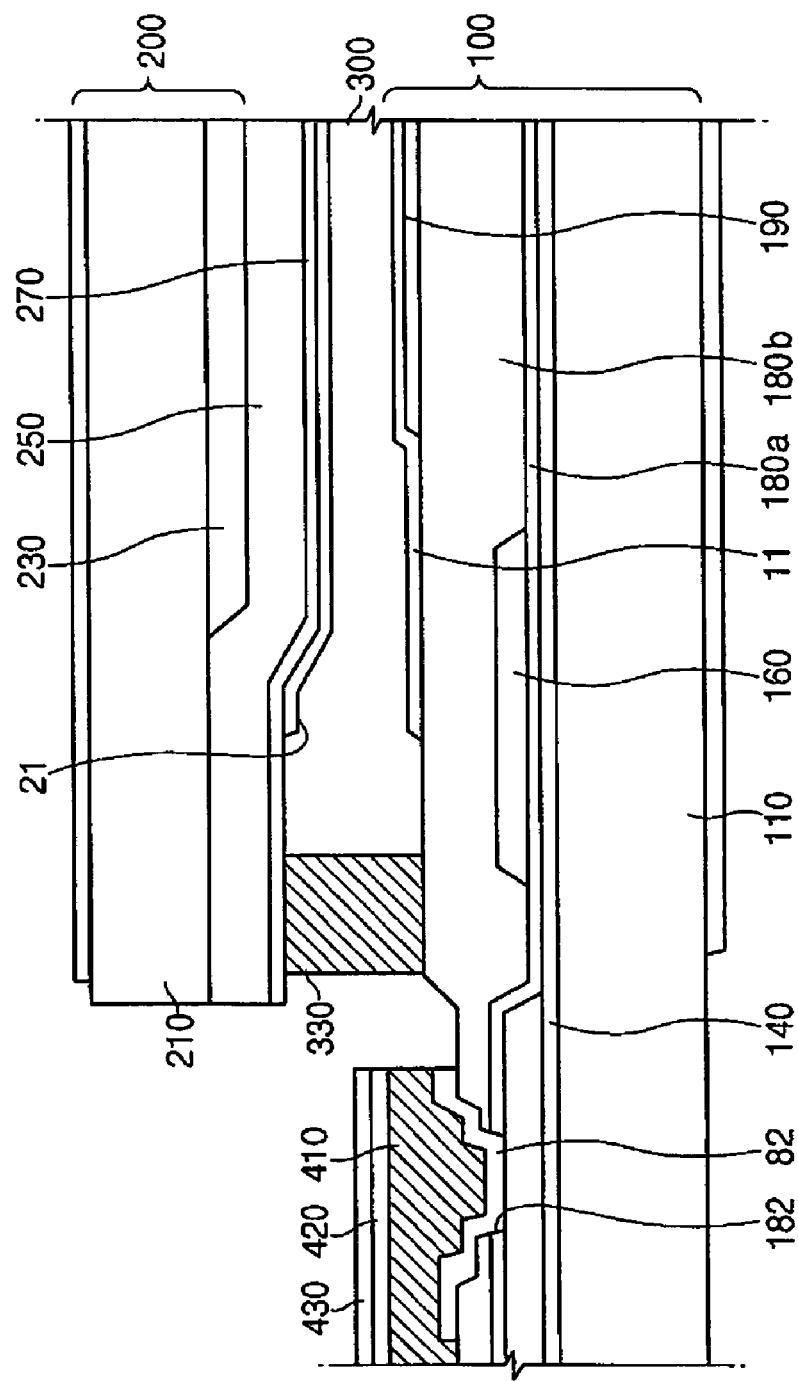
FIG. 12 is a sectional view of an LCD including the TFT array panel shown in FIG. 10 and a common electrode panel taken along the line XII-XII'.

Referring to FIG. 10-12, an LCD according to a second embodiment of the present invention will be described in detail.

FIG. 10 is a layout view of a TFT array panel for an LCD according to a fourth embodiment of the present invention, FIG. 11 is a sectional view of an LCD including the TFT array panel shown in FIG. 10 and a common electrode panel taken along the line XI-XI', and FIG. 12 is a sectional view of an LCD including the TFT array panel shown in FIG. 10 and a common electrode panel taken along the line XII-XII'.

The LCD according to this embodiment has a layout and a structure similar to the LCD shown in FIG. 1-3.

Regarding the TFT array panel 100, a plurality of gate lines 121 including gate electrodes 124 and a plurality of storage electrode lines 131 are formed on a substrate 110, and a gate insulating layer 140, a plurality of semiconductor islands 154, and a plurality of ohmic contact islands 161 and 162 are sequentially formed thereon. A plurality of data lines 171 including source electrodes 173 and including pairs of the data line branches 171a and 171b, a plurality of drain electrodes 175, and a storage connection 176 are formed on the ohmic contacts 161 and 162, and an inorganic passivation layer 180a and an organic passivation layer 180b are formed thereon. A plurality of contact holes 181-186 are provided at the passivation layers 180a and 180b and the gate insulating layer 140. A plurality of pixel electrodes 190, a plurality of contact assistants 81 and 82, and a plurality of connections 85 are formed on the organic passivation layer 180b. In addition, a plurality of light blocking members 160 are formed.

The common electrode panel 200 includes an insulating substrate 210 and a common electrode 270 formed thereon.

Alignment layers 11 and 21 are formed on inner surfaces of the two panels 100 and 200, and polarizers 12 and 22 are provided on outer surfaces of the panels 100 and 200. A sealant 330 and an LC layer 300 are formed between the panels 100 and 200, and a film 430 having signal lines 420 is attached onto the TFT array with anisotropic conductive film 410.

Unlike the LCD shown in FIG. 1-3, the light blocking members 160 of the LCD according to this embodiment are disposed on the same layer as the gate lines 121. The light blocking members 160 extend substantially in a longitudinal direction and they are disconnected from the gate lines 121 and the storage electrode lines 131 to be floating.

The light blocking members 160 cover gaps between the data line branches 171a and 171b, and the light blocking members 160 do not lie beyond outer edges of the data line branches 171a and 171b for preventing the decrease of the aperture ratio in the active area. As described above, since the light blocking members 160 are floating, there is no parasitic capacitance between the data line branches 171a and 171b and the light blocking members 160.

Figure 13:
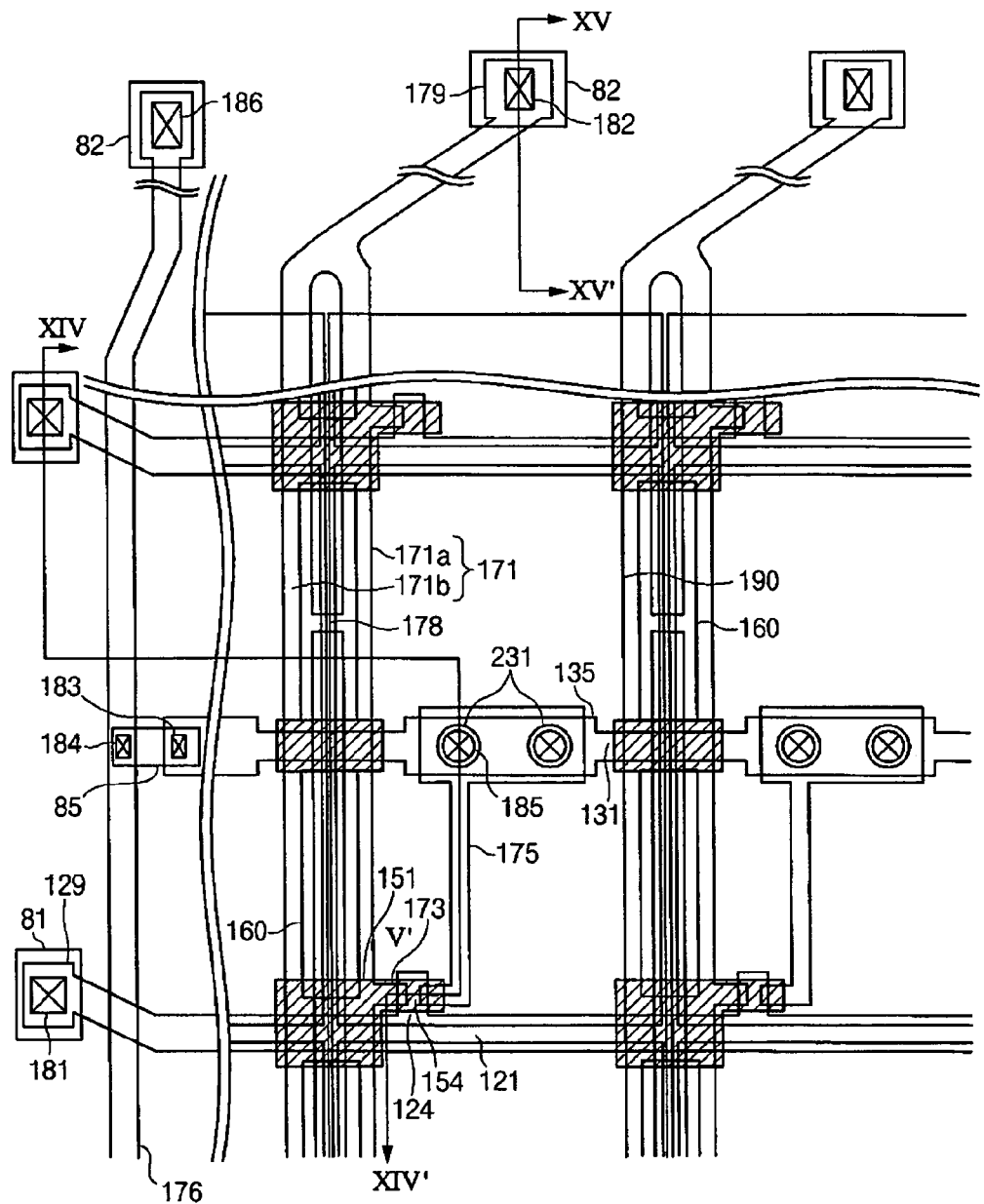
FIG. 13 is a layout view of a TFT array panel for an LCD according to a fifth embodiment of the present invention.
Figure 14:
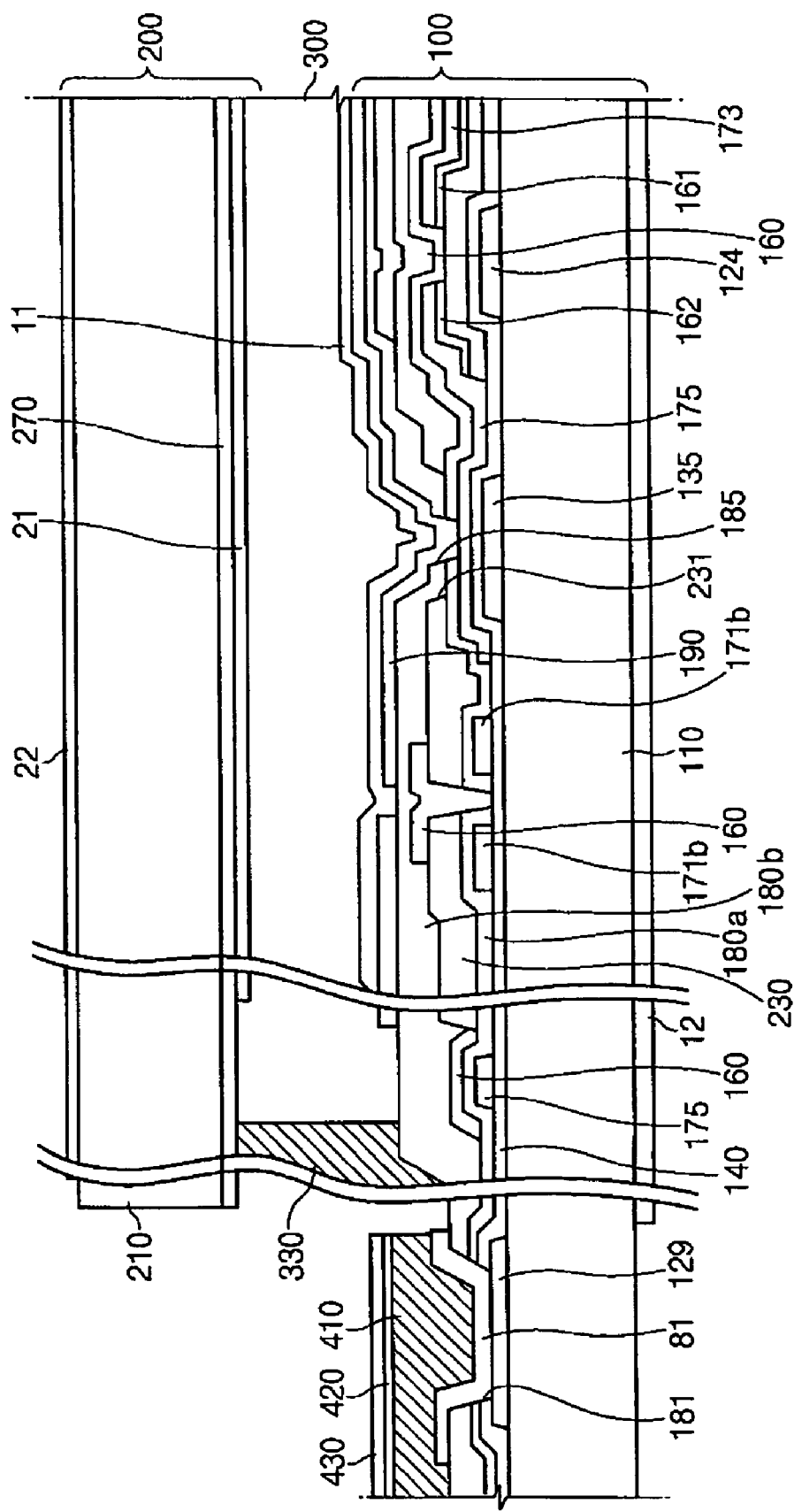
FIG. 14 is a sectional view of an LCD including the TFT array panel shown in FIG. 13 and a common electrode panel taken along the line XIV-XIV'.
Figure 15:
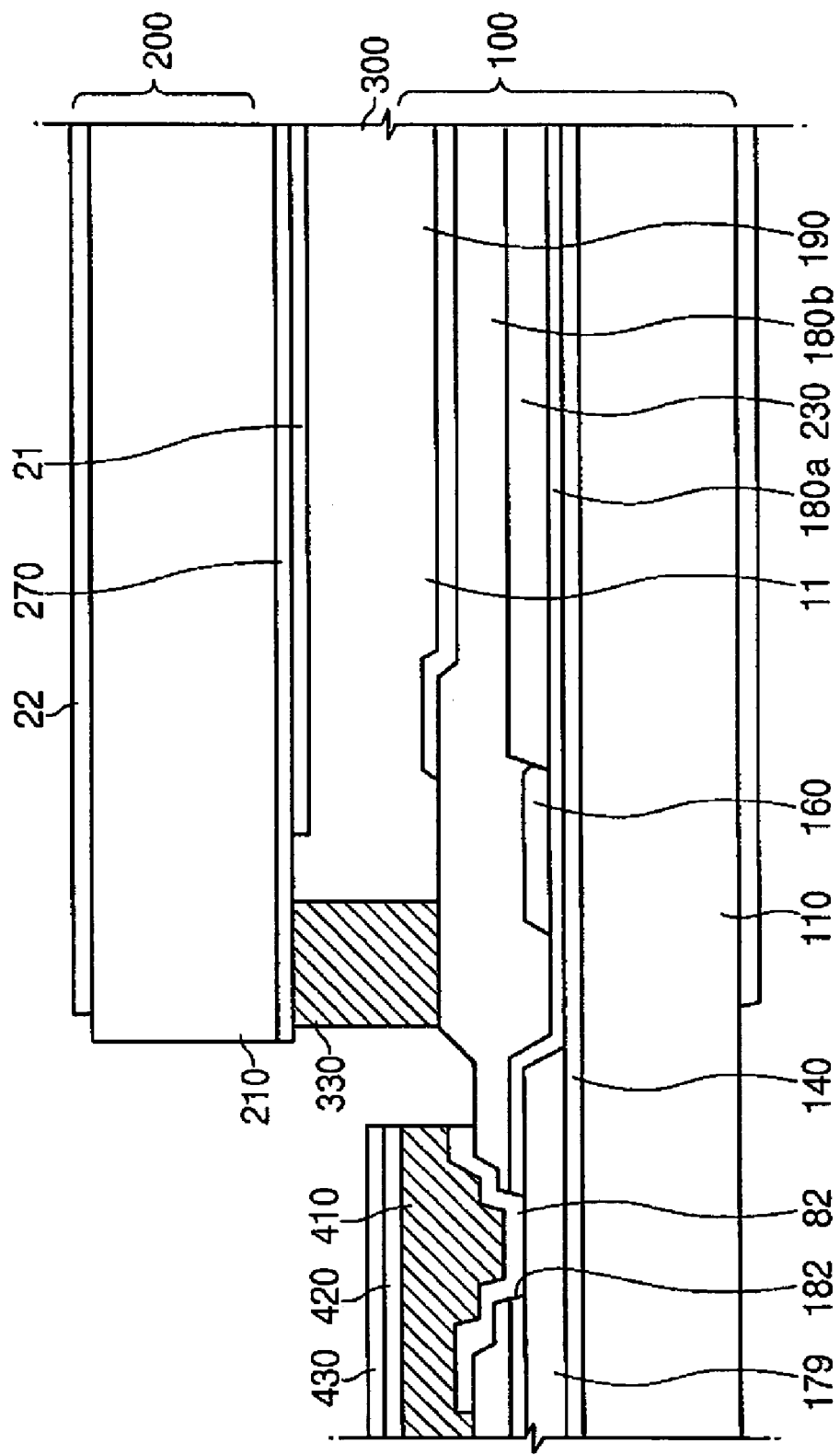
FIG. 15 is a sectional view of an LCD including the TFT array panel shown in FIG. 13 and a common electrode panel taken along the line XV-XV'.

Referring to FIG. 13-15, an LCD according to a fifth embodiment of the present invention will be described in detail.

FIG. 13 is a layout view of a TFT array panel for an LCD according to a fifth embodiment of the present invention, FIG. 14 is a sectional view of an LCD including the TFT array panel shown in FIG. 13 and a common electrode panel taken along the line XIV-XIV', and FIG. 15 is a sectional view of an LCD including the TFT array panel shown in FIG. 13 and a common electrode panel taken along the line XV-XV'.

The LCD according to a fifth embodiment has a layout and a structure similar to the LCD according to the fourth embodiment.

Regarding the TFT array panel 100, a plurality of gate lines 121 including gate electrodes 124, a plurality of storage electrode lines 131, and a plurality of light blocking members 160 are formed on a substrate 110, and a gate insulating layer 140, a plurality of semiconductor islands 154, and a plurality of ohmic contact islands 161 and 162 are sequentially formed thereon. A plurality of data lines 171 including source electrodes 173 and including pairs of the data line branches 171a and 171b, a plurality of drain electrodes 175, and a storage connection 176 are formed on the ohmic contacts 161 and 162, and an inorganic passivation layer 180a and an organic passivation layer 180b are formed thereon. A plurality of contact holes 181-186 are provided at the passivation layers 180a and 180b and the gate insulating layer 140. A plurality of pixel electrodes 190, a plurality of contact assistants 81 and 82, and a plurality of connections 85 are formed on the organic passivation layer 180b.

The common electrode panel 200 includes an insulating substrate 210 and a common electrode 270 formed thereon.

Alignment layers 11 and 21 are formed on inner surfaces of the two panels 100 and 200, and polarizers 12 and 22 are provided on outer surfaces of the panels 100 and 200. A sealant 330 and an LC layer 300 are formed between the panels 100 and 200, and a film 430 having signal lines 420 is attached onto the TFT array with anisotropic conductive film 410.

Referring to FIGS. 13 and 14, the color filter layer 230 of the LCD according to this embodiment is disposed on the TFT array panel 100 but not on the common electrode panel 200. The color filter layer 230 is disposed between the inorganic passivation layer 180a and the light blocking member 160. The color filter layer 230 represents three primary colors such as red, green, and blue. The color filter layer 230 has edges disposed between the data line branches 171a and 171b and covering inner edges of the data line branches 171a and 171b. The color filter layer 230 is disposed only in the active area and has a plurality of contact holes 231 exposing edges of the contact holes 185 of the inorganic passivation layer 180a. Since the color filter layer 230 is disposed on the TFT array panel 100, the common electrode 270 is disposed directly on the glass substrate 210 as shown in FIG. 14. Accordingly, the common electrode panel 200 according to this embodiment is easily formed without lithography.

As described above, each data line includes a pair of data line branches parallel to each other, the pixel electrodes overlap the data line branches, and a light blocking member covers gaps between the data line branches. Therefore, the parasitic capacitance between the data lines and the pixel electrodes is reduced and the aperture ratio is increased. This prevents the deterioration of the image quality due to the parasitic capacitance or the deviation thereof, and in particular, reduces the stitch defect generated by the deviation of the parasitic capacitance.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
a plurality of gate lines transmitting gate signals;
a plurality of data lines intersecting the gate lines and transmitting data signals, each data line including first and second data line branches electrically connected to each other and spaced apart from each other;

a plurality of pixel electrodes electrically connected to the gate lines and the data lines through a thin film transistor and covering edges of the first or the second data line branches;

a passivation layer disposed between the data lines and the pixel electrodes; and a light blocking member covering gaps between the first data line branches and the second data line branches.

2. The thin film transistor array panel of claim 1, wherein the light blocking member overlaps closer edges of the first and the second data line branches and does not overlap farther edges of the first and the second data line branches.

3. The thin film transistor array panel of claim 2, wherein the passivation layer comprises an inorganic insulating film.

4. The thin film transistor array panel of claim 1, wherein the passivation layer comprises organic insulator.

5. The thin film transistor array panel of claim 4, wherein the passivation layer comprises color filter.

6. The thin film transistor array panel of claim 1, further comprising a plurality of storage electrodes overlapping the pixel electrodes to form storage capacitance.

7. A liquid crystal display comprising:
the thin film transistor array panel of claim 1;
a common electrode panel facing the TFT array panel and including a
common electrode facing the pixel electrodes; and
a liquid crystal layer disposed between the TFT array panel and the common electrode panel.

8. The liquid crystal display of claim 7, wherein the liquid crystal layer has negative dielectric anisotropy and long axes of liquid crystal molecules in the liquid crystal layer are vertically aligned relative to surfaces of the panels.

9. The liquid crystal display of claim 8, wherein the common electrode and the pixel electrodes have pixel division members for dividedly aligning the liquid crystal molecules of the liquid crystal layer.

10. The liquid crystal display of claim 9, wherein pixel division members include cutouts or protrusions.

11. The liquid crystal display of claim 7, wherein each of the thin film transistors of the thin film transistor array panel comprises a gate electrode, a source electrode, and a drain electrode, and the liquid crystal display further comprises first semiconductor members disposed between the source electrodes and the drain electrodes.

12. The liquid crystal display of claim 11, further comprising second semiconductor members disposed under the data lines.

13. The liquid crystal display of claim 12, wherein the second semiconductor members have substantially the same shape as the data lines and the drain electrodes except for channel portions between the source electrodes and the drain electrodes and are wider than the data lines.

14. The liquid crystal display of claim 7, wherein the light blocking member comprises the same layer as the gate lines.

15. A thin film transistor array panel comprising:
a plurality of gate lines transmitting scanning signals;
a plurality of data lines intersecting the gate lines and transmitting data signals, each data line including first and second data line branches electrically connected to each other and spaced apart from each other;
a plurality of pixel electrodes electrically connected to the gate lines and the data lines through a thin film transistor and covering edges of the first or the second data line branches;
a color filter layer disposed between the data lines and the pixel electrodes; and
a light blocking member covering gaps between the first data line branches and the second data line branches, wherein the light blocking member includes the same layer as the gate lines and overlaps the data lines.

16. The thin film transistor array panel of claim 15, further comprising an inorganic insulating layer disposed between the color filter layer and the data lines.

17. The thin film transistor array panel of claim 15, further comprising storage electrodes overlapping the pixel electrodes to form storage capacitance.

18. The thin film transistor array panel of claim 15, wherein the pixel electrodes are curved at least once.

19. A liquid crystal display comprising:
a TFT array panel that includes a plurality of gate lines transmitting scanning signals, a plurality of data lines intersecting the gate lines and transmitting data signals, each data line including first and second data line branches electrically connected to each other and spaced apart from each other, a plurality of pixel electrodes electrically connected to the gate lines and the data lines through a thin film transistor and covering edges of the first or the second data line branches, and a color filter layer disposed between the data lines and the pixel electrodes;
a common electrode panel that faces the TFT array panel and includes a light blocking member having a projection onto the TFT array panel covering the first and the second data line branches; and
a liquid crystal layer disposed between the TFT array panel and the common electrode panel.

20. The liquid crystal display of claim 19, further comprising an inorganic insulating layer disposed between the color filter layer and the data lines.

21. The liquid crystal display of claim 19, further comprising storage electrodes overlapping the pixel electrodes to form storage capacitance.

22. The liquid crystal display of claim 19, wherein the projection of the light blocking member onto the TFT array panel covers both edges of the data lines.

23. The liquid crystal display of claim 19, wherein the pixel electrodes are curved at lease once.

* * * * *